(12) United States Patent
Tsutsumi et al.

(10) Patent No.: US 8,089,560 B2
(45) Date of Patent: Jan. 3, 2012

(54) IMAGE PROCESSING APPARATUS, IMAGE PROCESSING METHOD AND PROGRAM

(75) Inventors: Tomonori Tsutsumi, Tokyo (JP); Shigeru Harada, Tokyo (JP)

(73) Assignee: Sony Corporation (JP)

( * ) Notice: Subject to any disclaimer, the term of this patent is extended or adjusted under 35 U.S.C. 154(b) by 862 days.

(21) Appl. No.: 12/214,996

(22) Filed: Jun. 24, 2008

(65) Prior Publication Data

US 2009/0009665 A1    Jan. 8, 2009

(30) Foreign Application Priority Data

Jul. 4, 2007   (JP) ................................ P2007-176286

(51) Int. Cl.
 *H04N 5/202*   (2006.01)
(52) U.S. Cl. ......... 348/674; 348/671; 348/672; 345/690
(58) Field of Classification Search ................. None
 See application file for complete search history.

(56) References Cited

U.S. PATENT DOCUMENTS

| | | | | |
|---|---|---|---|---|
| 5,289,282 A * | 2/1994 | Tsuji et al. | ................... | 348/624 |
| 5,546,134 A * | 8/1996 | Lee | ................... | 348/673 |
| 6,040,860 A * | 3/2000 | Tamura et al. | ............... | 348/252 |
| 6,373,533 B1 * | 4/2002 | Kawabata et al. | ........... | 348/672 |
| 7,227,559 B2 * | 6/2007 | Aoki et al. | .................... | 345/690 |
| 7,839,455 B2 * | 11/2010 | Harada | ......................... | 348/672 |
| 2005/0128358 A1 * | 6/2005 | Nakajima et al. | ............. | 348/678 |
| 2007/0046827 A1 | 3/2007 | Harada | | |

FOREIGN PATENT DOCUMENTS

| | | | |
|---|---|---|---|
| JP | 11126255 | A | 5/1999 |
| JP | 2000004379 | A | 1/2000 |
| JP | 2000324363 | A | 11/2000 |
| JP | 2002125130 | A | 4/2002 |
| JP | 2004-266755 | A | 9/2004 |
| JP | 2005184048 | A | 7/2005 |
| JP | 2007-060580 | A | 3/2007 |

OTHER PUBLICATIONS

Office Action from Japanese Application No. 2007-176286, dated Jun. 21, 2011.

* cited by examiner

*Primary Examiner* — Kristine Kincaid
*Assistant Examiner* — Oschta Montoya
(74) *Attorney, Agent, or Firm* — Lerner, David, Littenberg, Krumholz & Mentlik, LLP

(57) ABSTRACT

An image processing apparatus according to an embodiment of the present invention includes a correction interval setting unit for setting a correction interval; a correction interval dividing unit for dividing the correction interval into a black side interval and a white side interval; histogram calculating units for calculating a total number of luminance histograms of the black side interval and the white side interval, respectively; gain setting units for setting gains of a γ curve for raising the luminance and a γ curve for lowering the luminance, respectively; gamma curve generating units for generating a gamma curve for raising the luminance and a gamma curve for lowering the luminance, respectively; a gamma curve combining unit for combining the gamma curve for raising the luminance and the gamma curve for lowering the luminance; and a luminance conversion unit for performing the luminance conversion process using the combined gamma curve.

10 Claims, 12 Drawing Sheets

FIG.7
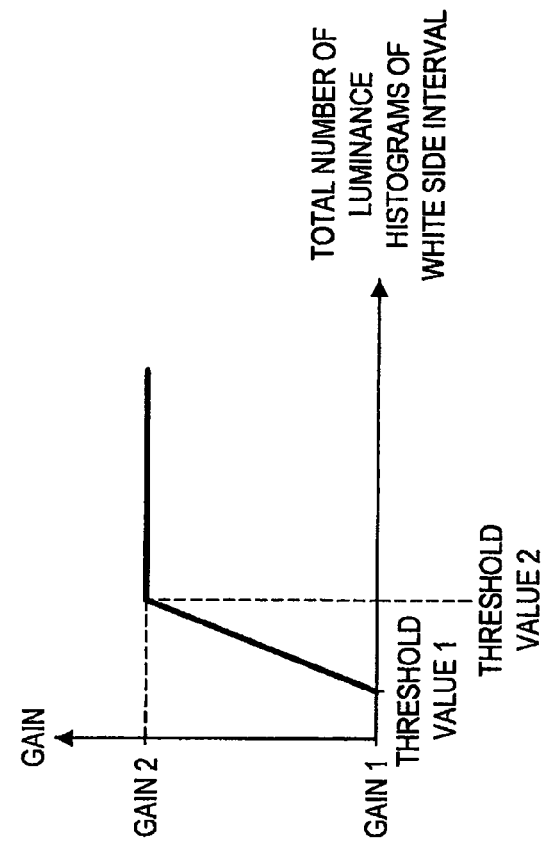
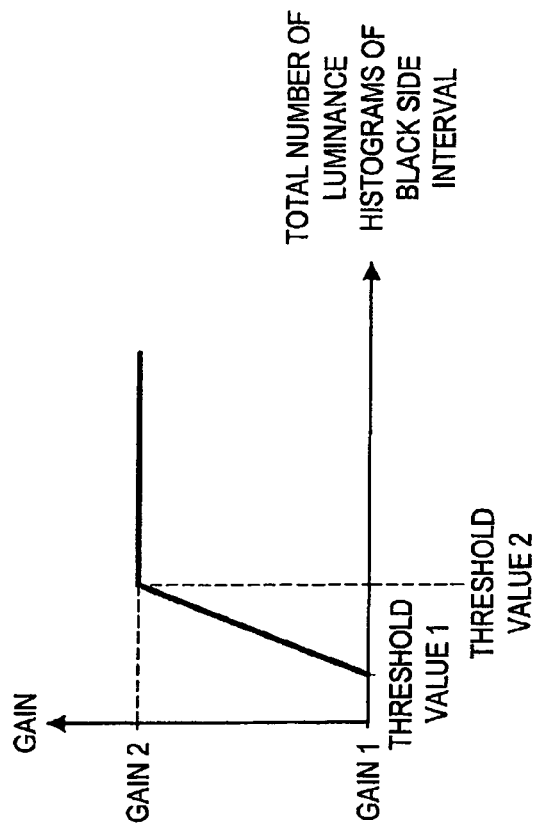

FIG.9
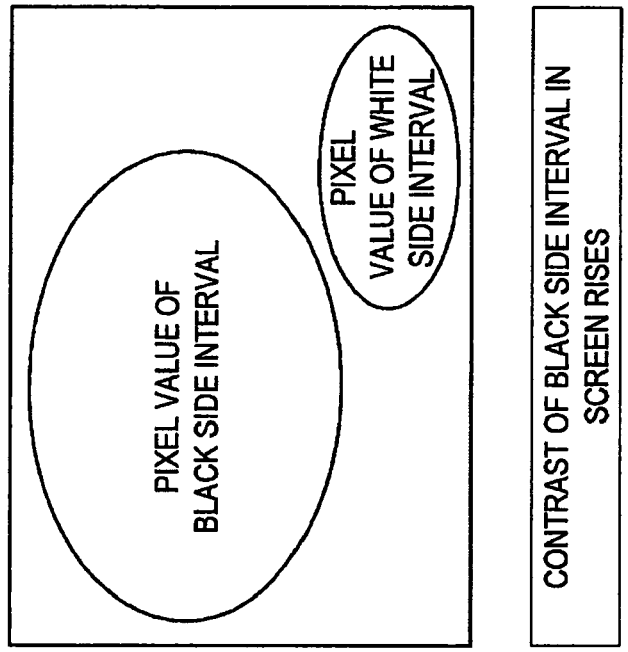
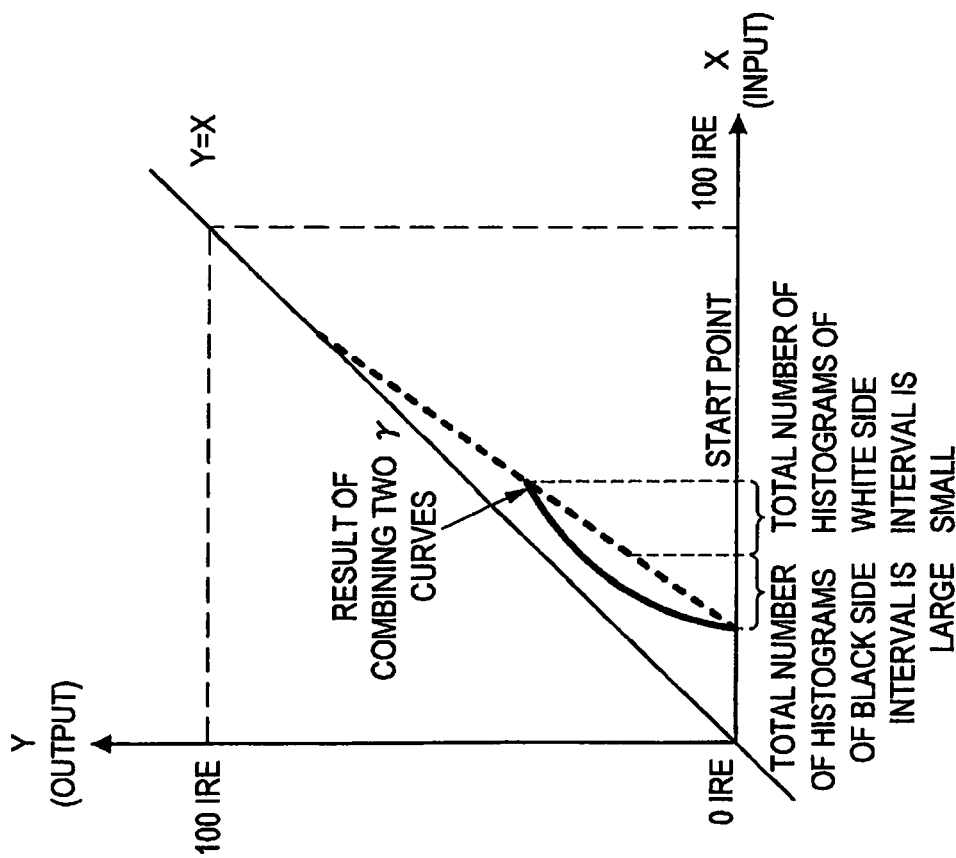

FIG.10
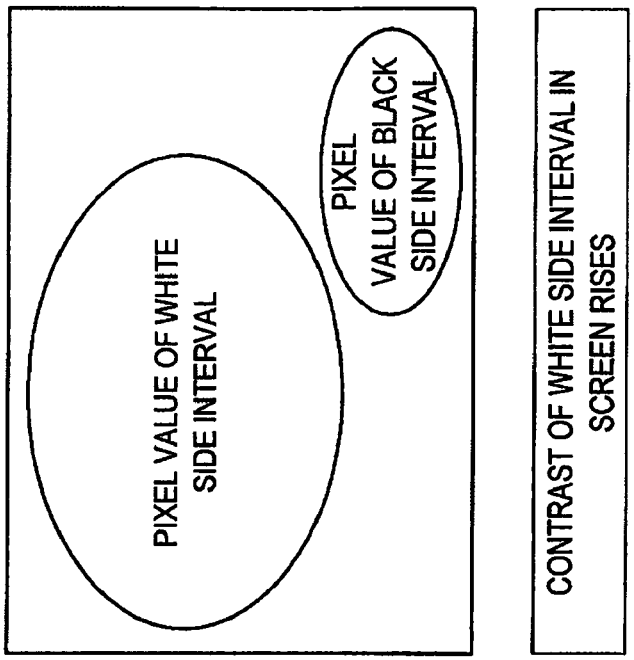
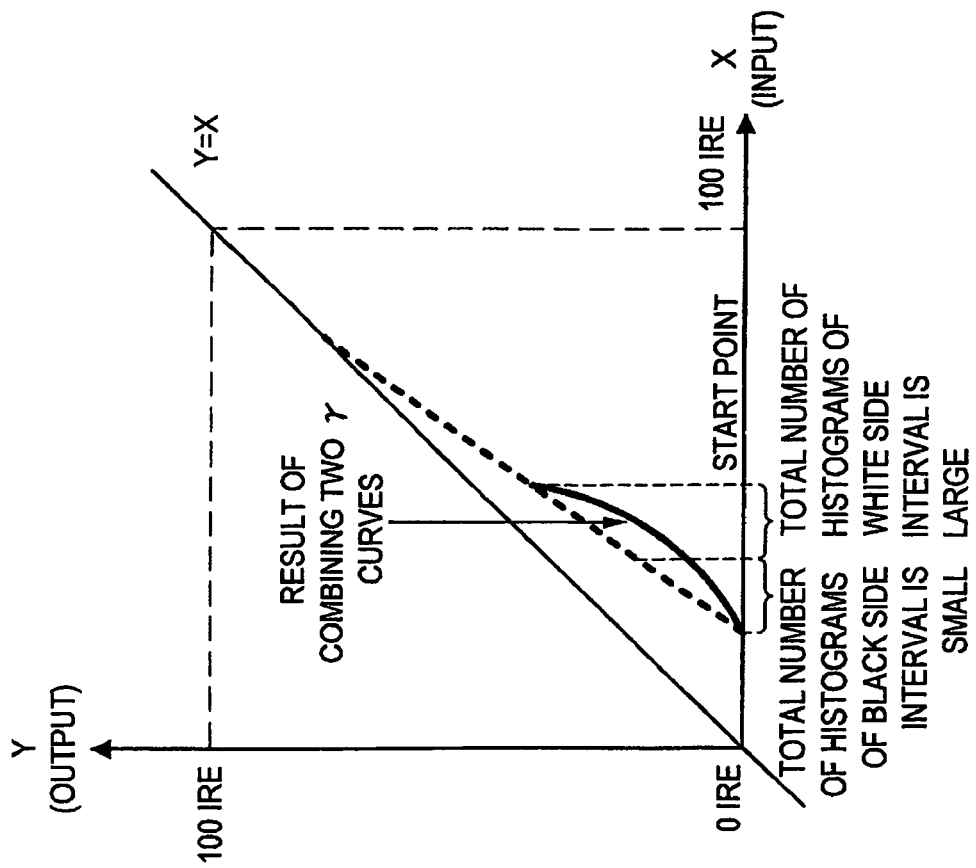

IMAGE PROCESSING APPARATUS, IMAGE PROCESSING METHOD AND PROGRAM

CROSS-REFERENCE TO RELATED APPLICATION

The present application claims priority from Japanese Patent Application No. JP 2007-176286, filed in the Japanese Patent Office on Jul. 4, 2007, the entire content of which is incorporated herein by reference.

BACKGROUND OF THE INVENTION

1. Field of the Invention

The present invention relates to an image processing apparatus, an image processing method, and a program.

2. Description of the Related Art

Equipments such as television receiver, VTR (Video Tape Recorder), digital camera, television camera, printer, or the like performs a correction to improve image quality on an input image and then outputs the same, and has a function of performing various image processing such as contrast adjustment (see e.g., Japanese Patent Application Laid-Open No. 2007-60580 and Japanese Patent Application Laid-Open No. 2004-266755). A technique of enhancing contrast mainly includes two types of black stretch and square gamma curve (hereinafter written as "γ curve").

The black stretch technique is a technique of enhancing the contrast of a luminance component by drawing in black within the input image. As shown in FIG. 1, draw-in of black changes according to the blackest level or the proportion of the black portion in the input image, where black is drawn in when the proportion of the black portion is not greater than or equal to a predetermined area and is not a large area, and is weakly drawn in when the blackest level is close to 0IRE or the proportion of the black portion in the input image is a large area. The black stretch starting point (input luminance value for starting black stretch) can be arbitrarily set. FIG. 1 is a graph describing the outline of a black stretch process, where horizontal axis represents an input luminance value (X), and the vertical axis represents an output luminance value (Y).

Contrast enhancement by the square γ curve is a technique of enhancing the contrast of the input image by performing a luminance conversion process of raising the luminance or lowering the luminance using the square γ curve with respect to the input luminance value contained in an arbitrarily set interval (range of input luminance value), as shown in FIG. 2. The gain of the square γ curve may be set as a fixed value or may be dynamically set based on a total number of luminance histograms of the input image, and the like. FIG. 2 is a graph describing an outline of a luminance conversion process by the square γ curve, where horizontal axis represents the input luminance value (X), and vertical axis represents the output luminance value (Y).

SUMMARY OF THE INVENTION

The black stretch technique described above, however, has the following drawbacks. Firstly, the expression near black (0IRE) is insufficient in the black stretch of the related art, and thus it is desirable to draw in the blackest level of the input image to black to enhance the contrast and to also enhance the expression of black. Secondly, in the black stretch of the related art, only the same input/output characteristics can be realized if the blackest level or the proportion of the black portion of the input image is the same even if the input image has different pictures near black (0IRE). Thirdly, the black stretch in the related art merely draws in black, and is not able to obtain Y (output luminance)>X (input luminance) by the γ curve for raising black, that is, raising luminance. Thus, the visibility may degrade if the entire input image is dark.

Contrast enhancement by the square γ curve has the following drawbacks. Firstly, when attempting to enhance contrast by the square γ curve, a location (A) where the contrast rises and a location (B) where the contrast lowers appear, as shown in FIG. 2, since the input/output characteristics are set with a curve. Secondly, there is a case of desiring to enhance the contrast by the square γ curve for raising the luminance and a case of desiring to enhance the contrast by the square γ curve for lowering the luminance depending on the picture of the input image, and the contrast sometimes may not be enhanced with only one of the γ curves.

In view of the above issues, the present invention desirably optimizes the γ curve and realizes contrast enhancement according to the picture of the input image in an image processing apparatus for performing luminance correction process using the γ curve with respect to the input image, an image processing method, and a program.

According to an embodiment of the present invention, there is provided an image processing apparatus for performing a luminance correction process of an input image by performing a luminance conversion process on input luminance data; the image processing apparatus including a correction interval setting unit for setting a correction interval which is a range of luminance level for performing the luminance correction process; a correction interval dividing unit for dividing the correction interval into two intervals of a black side interval having low luminance level and a white side interval having high luminance level; histogram calculating units for calculating a total number of luminance histograms of the black side interval and a total number of luminance histograms of the white side interval, respectively; gain setting units for setting a gain of a gamma curve for raising the luminance based on the calculated total number of luminance histograms of the black side interval and a gain of a gamma curve for lowering the luminance based on the calculated total number of luminance histograms of the white side interval, respectively; gamma curve generating units for generating a gamma curve for raising the luminance based on the gain of the curve for raising the luminance, and generating a gamma curve for lowering the luminance based on the gain of the curve for lowering the luminance, respectively; a gamma curve combining unit for combining the gamma curve for raising the luminance and the gamma curve for lowering the luminance; and a luminance conversion unit for performing the luminance conversion process on the input luminance data in the correction interval using the combined gamma curve.

According to the image processing apparatus of an embodiment of the present invention having the above configuration, an optimum γ curve can be generated according to the total number of luminance histograms of the black side interval and the white side interval, respectively, in the correction interval. Therefore, enhancement of contrast corresponding to the picture of the input image can be realized by adjusting the contrast using such γ curve.

The image processing apparatus may perform the luminance correction process of an image subjected to a black stretch process.

The correction interval may be an interval from a predetermined luminance level to a luminance level at which output luminance data after the black stretch process becomes zero; an interval in which the input luminance level is from a predetermined luminance level to a luminance level of 0[IRE]; or an interval in which the input luminance level is from a predetermined luminance level to a luminance level of 100[IRE].

An accuracy of division of the luminance histogram may be 128 divisions.

The gain of the gamma curve is preferably set to be larger the greater the total number of luminance histograms.

The gamma curve for raising the luminance is expressed with Equation (1) where X is an input luminance value and gam_upper[X] is an output luminance value after luminance conversion; and the gamma curve for lowering the luminance is expressed with Equation (2) where X is the input luminance value, and gam_lower[X] is an output luminance value after luminance conversion.

$$\text{gam\_upper}[X] = \frac{\text{gain\_upper} \times (X - \text{end}) \times (\text{start} - X)}{256 \times (\text{start} - \text{end})} \quad (1)$$

$$\text{gam\_lower}[X] = -\frac{\text{gain\_lower} \times (X - \text{end}) \times (\text{start} - X)}{256 \times (\text{start} - \text{end})} \quad (2)$$

In Equations (1) and (2), gain_upper: gain of the gamma curve for raising the luminance gain_lower: gain of the gamma curve for lowering the luminance start: input luminance value for starting the luminance conversion process end: input luminance value for terminating the luminance conversion process.

The gamma curve after combining the gamma curve for raising the luminance and the gamma curve for lowering the luminance may be expressed with Equation (3) where gam[X] is an output luminance value after luminance conversion.

$$\text{gam}[X] = \text{gam\_upper}[X] + \text{gam\_lower}[X] \quad (3)$$

According to another embodiment of the present invention, there is provided an image processing method for performing a luminance correction process of an input image by performing a luminance conversion process on input luminance data; the image processing method including the steps of: setting a correction interval which is a range of luminance level for performing the luminance correction process; dividing the correction interval into two intervals of a black side interval having low luminance level and a white side interval having high luminance level; calculating a total number of luminance histograms of the black side interval and a total number of luminance histograms of the white side interval, respectively; setting a gain of a gamma curve for raising the luminance based on the calculated total number of luminance histograms of the black side interval and a gain of a gamma curve for lowering the luminance based on the calculated total number of luminance histograms of the white side interval, respectively; generating a gamma curve for raising the luminance based on the gain of the curve for raising the luminance, and generating a gamma curve for lowering the luminance based on the gain of the curve for lowering the luminance, respectively; combining the gamma curve for raising the luminance and the gamma curve for lowering the luminance; and performing the luminance conversion process on the input luminance data in the correction interval using the combined gamma curve.

According to the image processing method of an embodiment of the present invention having the above configuration, an optimum γ curve can be generated according to the total number of luminance histograms of the black side interval and the white side interval, respectively, in the correction interval. Therefore, enhancement of contrast corresponding to the picture of the input image can be realized by adjusting the contrast using such γ curve.

According to another further embodiment of the present invention, there is provided a program for causing a computer to function as a correction interval setting unit for setting a correction interval which is a range of luminance level for performing the luminance correction process; a correction interval dividing unit for dividing the correction interval into two intervals of a black side interval having low luminance level and a white side interval having high luminance level; histogram calculating units for calculating a total number of luminance histograms of the black side interval and a total number of luminance histograms of the white side interval, respectively; gain setting units for setting a gain of a gamma curve for raising the luminance based on the calculated total number of luminance histograms of the black side interval and a gain of a gamma curve for lowering the luminance based on the calculated total number of luminance histograms of the white side interval, respectively; gamma curve generating units for generating a gamma curve for raising the luminance based on the gain of the curve for raising the luminance, and generating a gamma curve for lowering the luminance based on the gain of the curve for lowering the luminance, respectively; a gamma curve combining unit for combining the gamma curve for raising the luminance and the gamma curve for lowering the luminance; and a luminance conversion unit for performing the luminance conversion process on the input luminance data in the correction interval using the combined gamma curve.

According to the embodiments of the present invention, the γ curve is optimized, and enhancement of contrast corresponding to the picture of the input image can be realized in the image processing apparatus, the image processing method, and the program for performing luminance correction process using the γ curve on the input image.

BRIEF DESCRIPTION OF THE DRAWINGS

FIG. 7 is an explanatory view showing a gain setting method of a γ curve in the image processing method according to the embodiment;

FIG. 9 is an explanatory view for describing effects of contrast enhancement of when the image processing method according to the embodiment is used;

FIG. 10 is an explanatory view for describing effects of contrast enhancement of when the image processing method according to the embodiment is used;

DETAILED DESCRIPTION OF THE PREFERRED EMBODIMENTS

Figure 1:
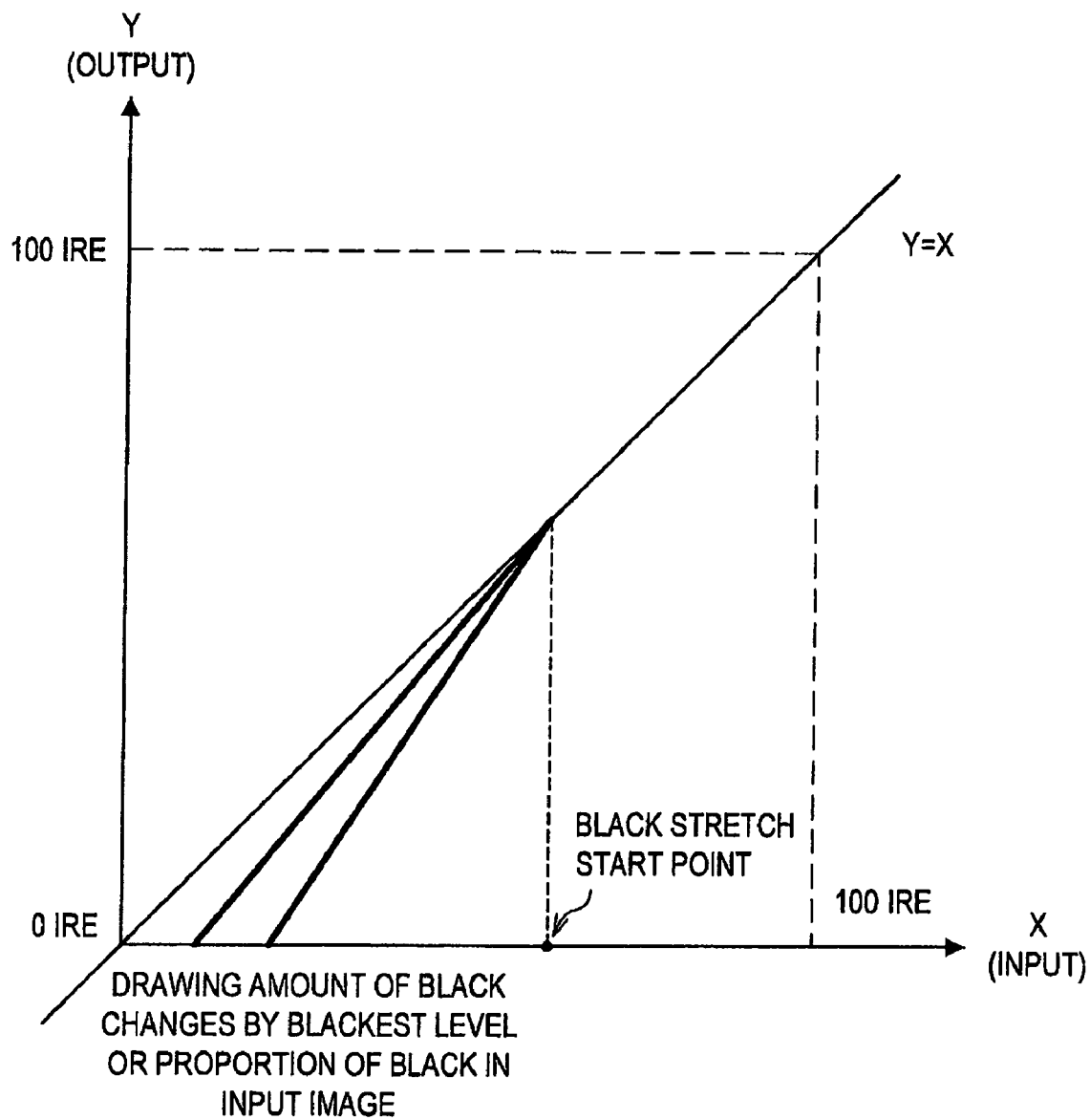
FIG. 1 is a graph describing an outline of a black stretch process.
Figure 2:
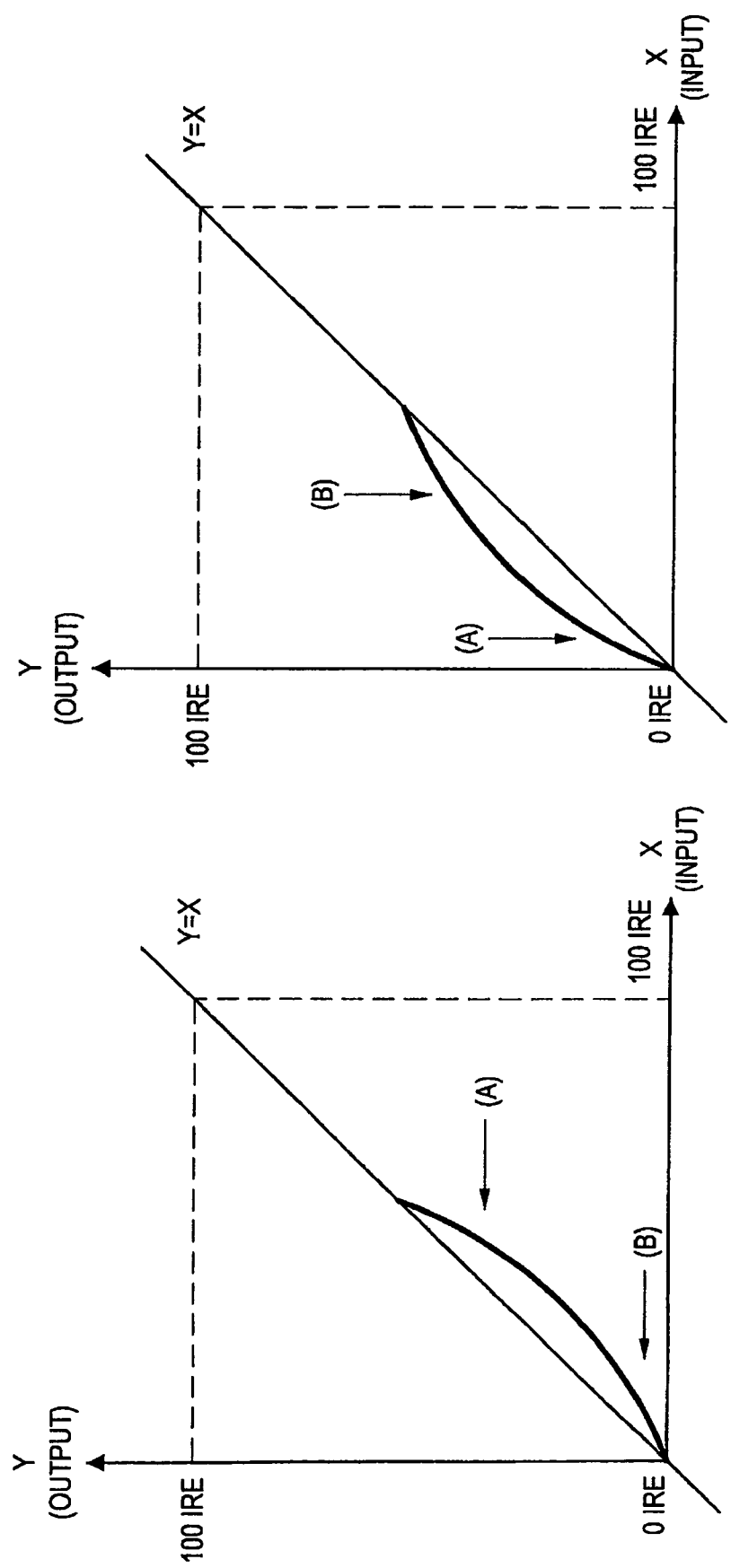
FIG. 2 is a graph describing an outline of a luminance conversion process by a square γ curve.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Outline of the Present Invention)

The present invention relates to an image processing apparatus, an image processing method and a program having a function of enhancing the contrast of the input image by performing a luminance correction process on the input image (in particular, image after the black stretch process).

The luminance correction process according to an embodiment of the present invention is mainly divided into the following steps (1) to (7).

(1) Correction interval setting step: Setting the correction interval which is the range of the luminance level to perform the luminance correction process.

(2) Correction interval dividing step: Dividing the correction interval set in step (1) to two intervals of a black side interval having low luminance level and a white size interval having a high luminance level.

(3) Histogram calculating step: Calculating the total number of luminance histograms of the black side interval and the total number of luminance histograms of the white side interval.

(4) Gain setting step: Setting the gain of the gamma curve for raising the luminance based on the total number of luminance histograms of the black side interval calculated in step (3). Setting the gain of the gamma curve for lowering the luminance based on the total number of luminance histograms of the white side interval calculated in step (3).

(5) Gamma curve generating step: Generating the gamma curve for raising the luminance based on the gain of the curve for raising the luminance calculated in step (4). Generating the gamma curve for lowering the luminance based on the gain of the curve for lowering the luminance calculated in step (4).

(6) Gamma curve combining step: Combining the gamma curve for raising the luminance and the gamma curve for lowering the luminance generated in step (5).

(7) Luminance conversion step: Performing the luminance conversion process on the input luminance data in the correction interval using the gamma curve combined in step (6).

(Function Configuration of the Image Processing Apparatus According to the Present Embodiment)

Figure 3:
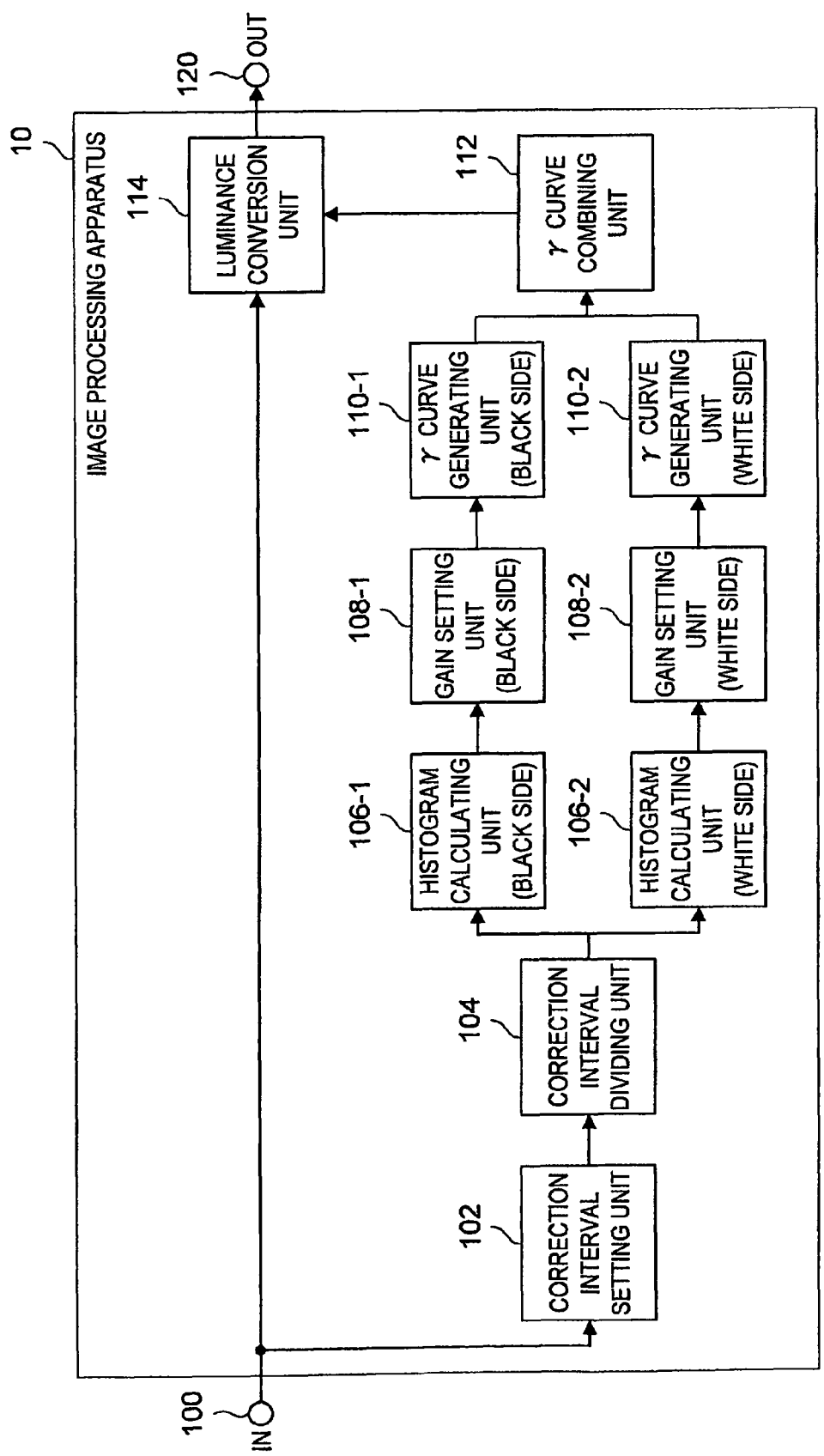
FIG. 3 is a block diagram showing a function configuration of an image processing apparatus according to one embodiment of the present invention.

The function configuration of the image processing apparatus 10 according to one embodiment of the present invention for performing such luminance correction process will now be described based on FIG. 3. FIG. 3 is a block diagram showing a function configuration of the image processing apparatus 10 according to the present embodiment.

As shown in FIG. 3, the image processing apparatus 10 according to the present embodiment mainly includes a correction interval setting unit 102, a correction interval dividing unit 104, two histogram calculating units 106-1, 106-2, two gain setting units 108-1, 108-2, two γ curve generating units 110-1, 110-2, a γ curve combining unit 112, and a luminance conversion unit 114.

The correction interval setting unit 102 sets the range of luminance level desired to enhance the contrast of the input image by performing luminance correction on the input image, that is, the correction interval which is the range of input luminance value for performing the luminance conversion process based on the input luminance data of the input image input from an input unit 100. When the input image is an image subjected to the black stretch process, the correction interval setting unit 102 can set the interval from the arbitrarily set "starting point (maximum value of input luminance value)" to "point at which the output luminance level of the image subjected to the black stretch process becomes zero (minimum value of input luminance value)" as the correction interval. The "starting point" may be the input luminance value of about 40IRE. According to the standard by NTSC (National Television Standards Committee), 100% white of the image signal is 100IRE, and 100% black is 0IRE. The "point at which the output luminance level of the image subjected to the black stretch process becomes zero" is set in the black stretch process according the blackest level or the proportion of the black portion of the input image.

The correction interval dividing unit 104 divides the correction interval set by the correction interval setting unit 102 into two intervals of a black side interval having low luminance level (input luminance value), that is, a interval close to 0IRE, and a white side interval having high luminance level, that is, a interval close to 100IRE. The point of dividing the correction interval can be arbitrarily set, but is basically exactly the intermediate position of the correction interval (e.g., if starting point is 40IRE, the input luminance value is point of 20IRE) so that the luminance range of the white side interval and the luminance range of the black side interval become equal. However, the black side interval is set larger than the white side interval if the contrast of the black side interval is given more weight, and the white side interval is set larger than the black side interval if the contrast of the white side interval is given more weight.

The histogram calculating units 106-1, 106-2 calculate the total number of luminance histograms of the black side interval and the total number of luminance histograms of the white side interval, respectively. When the histogram calculating units 106-1, 106-2 calculate the total number of luminance histograms, the luminance histograms of the black side interval and the white side interval are first respectively created, and the total number of luminance histograms of the black side interval and the white side interval (number of pixels contained in the respective intervals) are calculated with reference to the created luminance histograms. The accuracy of division of the luminance histogram in the present embodiment is 128 divisions, and the like.

The gain setting unit 108-1 sets the gain of the γ curve for raising the luminance based on the total number of luminance histograms of the black side interval calculated by the histogram calculating unit 106-1. The gain setting unit 108-2 sets the gain of the γ curve for lowering the luminance based on the total number of luminance histograms of the white side interval calculated by the histogram calculating unit 106-2. The details on the method of setting the gain of the γ curve will be hereinafter described, but the gain of the γ curve is set so as to be larger the greater the total number of luminance histograms. The threshold value and the gain of the total number of luminance histograms may be arbitrarily set with different values for the γ curve for raising the luminance and the γ curve for lowering the luminance.

The γ curve generating unit 110-1 generates the γ curve for raising the luminance based on the gain of the γ curve for raising the luminance set by the gain setting unit 108-1. The γ curve generating unit 110-2 generates the γ curve for lowering the luminance based on the gain of the γ curve for lowering the luminance set by the gain setting unit 108-2. The contrast of the portion contained in the black side interval of the input image enhances by the γ curve for raising the luminance generated as above, and the contrast of the portion contained in the white side interval of the input image enhances by the γ curve for lowering the luminance.

The γ curve for raising the luminance is expressed with the following Equation (1) where X is the input luminance value, and gam_upper[X] is the output luminance value after luminance conversion.

$$\text{gam\_upper}[X] = \frac{\text{gain\_upper} \times (X - \text{end}) \times (\text{start} - X)}{256 \times (\text{start} - \text{end})} \quad (1)$$

The γ curve for lowering the luminance can be expressed with the following Equation (2) where X is the input luminance value, and gam_lower[X] is the output luminance value after luminance conversion.

$$\text{gam\_lower}[X] = -\frac{\text{gain\_lower} \times (X - \text{end}) \times (\text{start} - X)}{256 \times (\text{start} - \text{end})} \quad (2)$$

In Equations (1) and (2), gain_upper: gain of the gamma curve for raising the luminance gain_lower: gain of the gamma curve for lowering the luminance start: input luminance value for starting the luminance conversion process end: input luminance value for terminating the luminance conversion process (when luminance conversion process is performed on the image subjected to the black stretch process, point at which the black stretch process result becomes Y(output)=0).

The γ curve combining unit 112 combines the γ curve for raising the luminance generated by the γ curve generating unit 110-1 and the γ curve for lowering the luminance generated by the γ curve generating unit 110-2.

Here, if the γ curve for raising the luminance is generated by Equation (1), and the γ curve for lowering the luminance is generated by Equation (2), the γ curve after combination can be expressed with Equation (3) where gam[X] is the output luminance value after luminance conversion.

$$\text{gam}[X] = \text{gam\_upper}[X] + \text{gam\_lower}[X] \quad (3)$$

The luminance conversion unit 114 performs luminance conversion process on the input luminance data within the correction interval input from the input unit 100 using the γ curve combined by the γ combining unit 112, and outputs the output luminance data after luminance conversion to an output unit 120. Thus, the contrast of both intervals of the black side interval and the white side interval can be enhanced by performing the luminance conversion process using the γ curve obtained by combining two γ curves of the γ curve for raising the luminance and the γ curve for lowering the luminance.

(Hardware Configuration of the Image Processing Apparatus According to the Present Embodiment)

Figure 4:
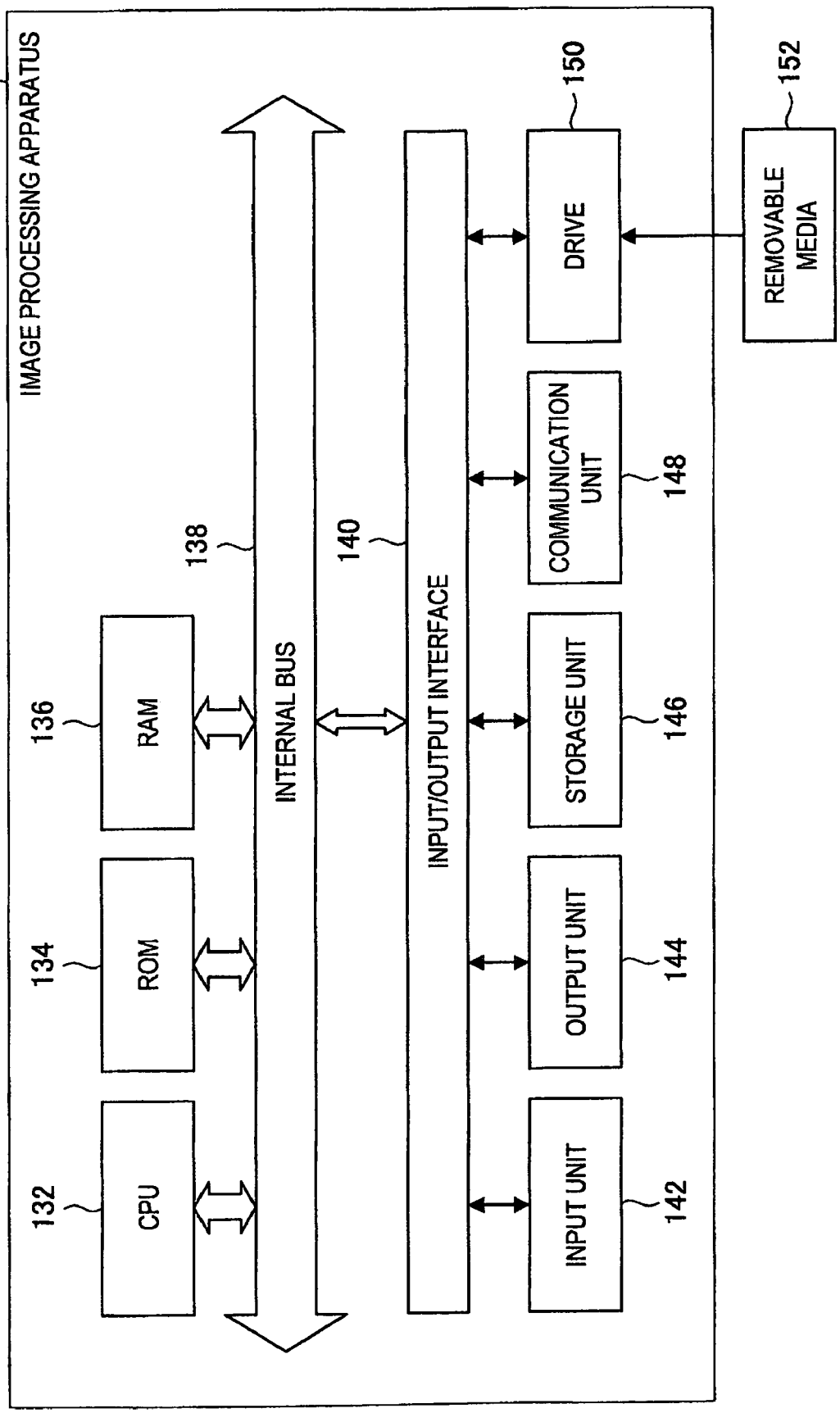
FIG. 4 is a block diagram showing a hardware configuration of the image processing apparatus according to the embodiment.

The function configuration of the image processing apparatus 10 according to the present embodiment has been described, where such functions can be realized by hardware as shown in FIG. 4. The hardware configuration of the image processing apparatus 10 according to the present embodiment will be described below based on FIG. 4. FIG. 4 is a block diagram showing a hardware configuration of the image processing apparatus 10 according to the present embodiment.

As shown in FIG. 4, the image processing apparatus 10 includes a CPU (Central Processing Unit) 132, a ROM (Read Only Memory) 134, a RAM (Random Access Memory) 136, an internal bus 138, an input/output interface 140, an input unit 142, an output unit 144, a storage unit 146, a communication unit 148, a drive 150, a removable media 152, and the like.

The CPU 132 executes various processes according to programs stored in the ROM 134 or programs loaded to the RAM 136 from the storage unit 146. The processes executed by the image processing apparatus 10 include, for instance, correction interval setting process, correction interval dividing process, histogram calculating process, gain setting process, gamma curve generating process, gamma curve combining process, luminance conversion process, and the like. The RAM 136 may appropriately store data etc. which are necessary when the CPU 132 executes various processes.

The CPU 132, the ROM 134, and the RAM 136 are connected to each other by way of the internal bus 138. The input/output interface 140 is also connected to the internal bus 138.

The input unit 142, the output unit 144, the storage unit 146, and the communication unit 148 are connected to the input/output interface 140. The input unit 142 includes keyboard, mouse, and the like, and the output unit 144 includes display such as CRT and LCD (Liquid Crystal Display), speaker, and the like. The storage unit 146 includes a hard disc and the like. The communication unit 148 includes modem, terminal adapter, and the like, and performs communication process via various networks including telephone line and CATV.

The drive 150 is connected to the input/output interface 140 as necessary, the removable media 152 such as magnetic disc, optical disc, magnetic optical disc, and semiconductor memory is appropriately loaded, and the program read out from the removable media 152 is stored in the storage unit 146 as necessary.

An example of the image processing apparatus 10 having the above configuration includes equipments such as television receiver, VTR (Video Tape Recorder), digital camera, television camera, or printer.

(Image Processing Method According to the Present Embodiment)

Figure 5:
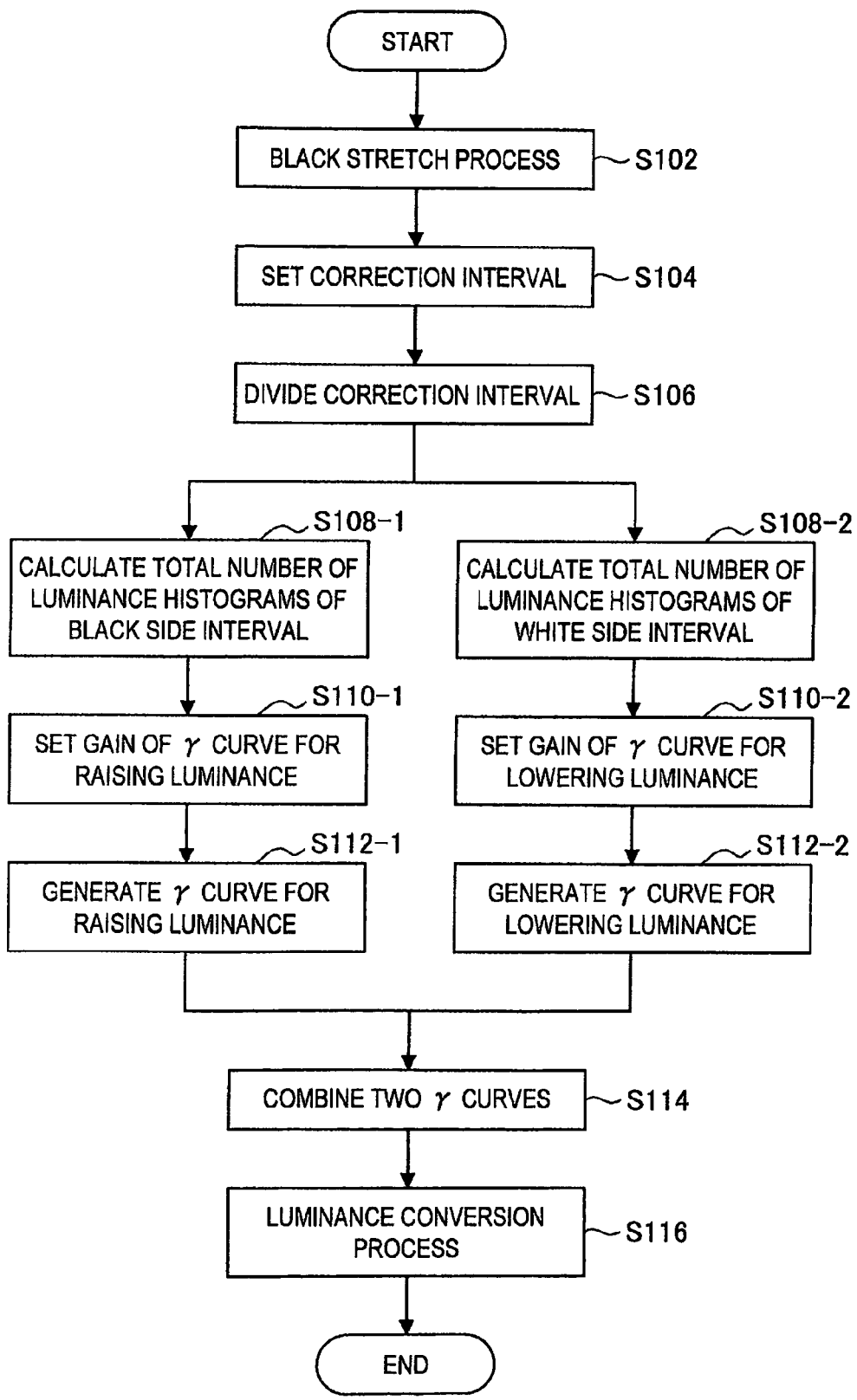
FIG. 5 is a flowchart showing a processing procedure of an image processing method according to the embodiment.
Figure 6:
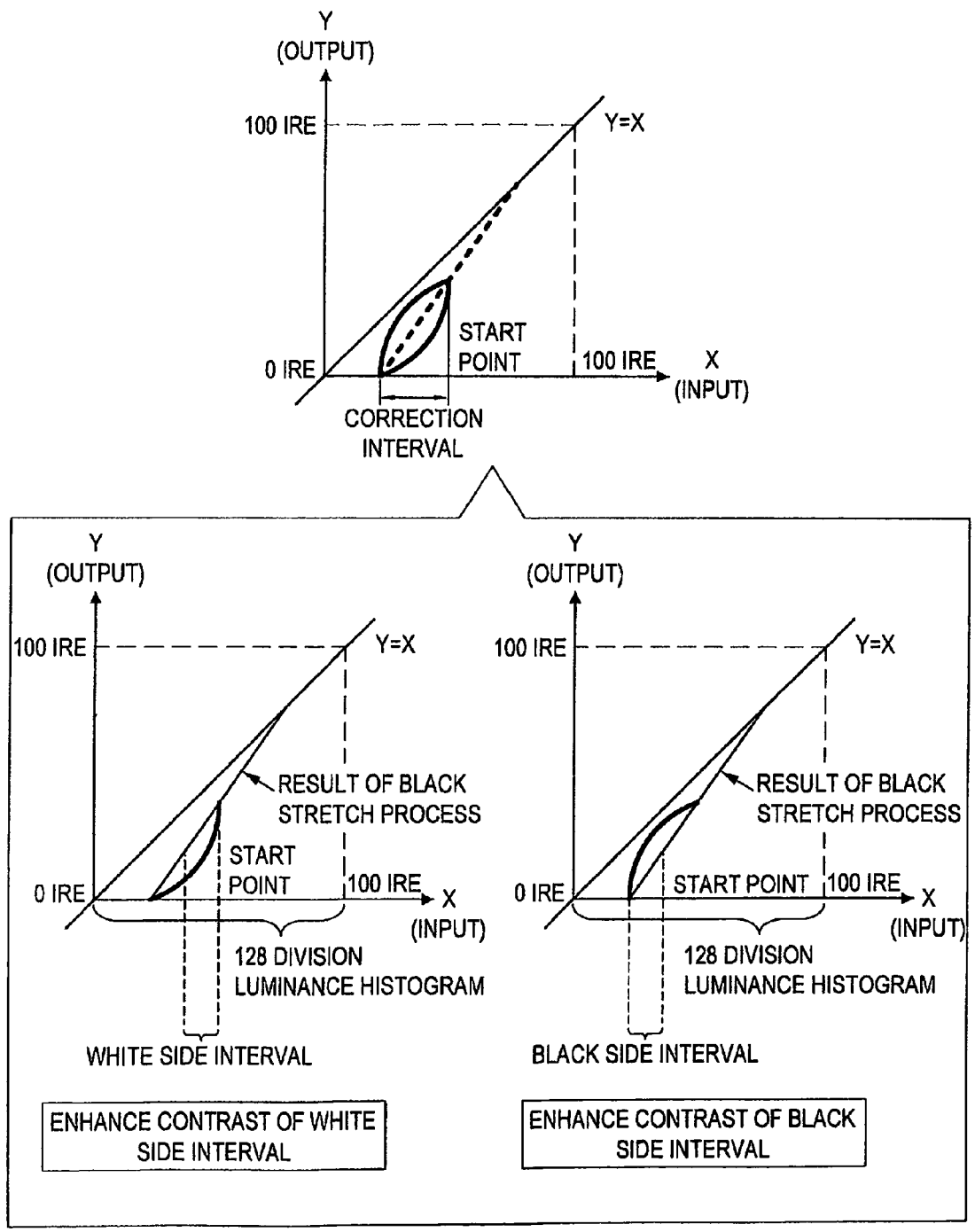
FIG. 6 is an explanatory view showing an outline of the image processing method according to the embodiment.

The configuration of the image processing apparatus 10 has been described based on FIGS. 3 and 4, and now the image processing method using the image processing apparatus 10 having such configuration will be described based on FIGS. 5 to 7. FIG. 5 is a flowchart showing the processing procedure of the image processing method according to the present embodiment, FIG. 6 is an explanatory view showing an outline of the image processing method according to the present embodiment, and FIG. 7 is an explanatory view showing a gain setting method of the γ curve in the image processing method according to the present embodiment. In the following description, a case in which the image processing method according to the present embodiment is applied to perform further contrast enhancement on the image subjected to the black stretch process will be described by way of example.

As shown in FIG. 5, the black stretch process is first performed (S102). A known method can be used for the method of the black stretch process, and thus the detailed description will be omitted herein. The result of the black stretch process is shown with a broken line in FIG. 6. With reference to FIG. 6, it can be found as a result of the black stretch process that a slope of a line representing the input/output characteristic (relationship between input luminance X and output luminance Y) is greater than Y=X, and the blackest level is moved towards the 100IRE side.

The image processing method according to the present embodiment enhances the contrast of the input image by performing the luminance correction process on the image subjected to the black stretch process. Specifically, the correction interval setting unit 102 first performs luminance correction on the input image to set the range of the luminance level to enhance the contrast of the input image, that is, the correction interval which is the range of the input luminance value to perform the luminance conversion process (S104). In the present embodiment, this correction interval may be from "starting point (maximum value of input luminance value)" to "point at which the output luminance level of the image subjected to the black stretch process becomes zero (minimum value of input luminance value)", as shown in FIG. 6. The "starting point" can be arbitrarily set, and may be the input luminance value of about 40IRE. The "point at which the output luminance level of the image subjected to the black stretch process becomes zero" is set in the black stretch process (S102) according to the blackest level or the proportion of the black portion of the input image.

The correction interval dividing unit 104 divides the correction interval set in step S104 into two intervals of a black side interval having low luminance level (input luminance value), that is, 0IRE, and a white side interval having high luminance level, that is, 100IRE (S106). The white side interval and the black side interval are shown in FIG. 6. The processes of steps S108 to S112 described below are performed for the black side interval and the white side interval, respectively.

First, the process of the black side interval will be described. The histogram calculating unit 106-1 calculates the total number of luminance histograms of the black side interval (S108-1). In calculating the total number of luminance histograms, the histogram calculating unit 106-1 creates the luminance histogram of the black side interval, and references the created luminance histogram to calculate the total number of luminance histograms of the black side interval (number of pixels contained in the black side interval). 128 division etc. is assumed for the accuracy of division of the luminance histogram.

The gain setting unit 108-1 sets the gain of the γ curve for raising the luminance based on the total number of luminance histograms calculated in step S108-1 (S110-1). The details of the method of setting the gain of the γ curve for raising the luminance will be described with reference to the left diagram of FIG. 7. As shown in the left diagram of FIG. 7, the gain of the γ curve is set so as to become larger the greater the total number of luminance histograms. More specifically, in setting the gain of the γ curve for raising the luminance, an arbitrary threshold value is set with respect to the total number of luminance histograms of the black side interval, and the gain is set so that a predetermined gain is obtained according to such threshold value. A case where two threshold values (threshold value 1, threshold value 2) of the total number of luminance histograms of the black side interval are provided is shown in the left diagram of FIG. 7, where the gain conversion curve for calculating the gain of the γ curve is set such that the gain is gain 1 until 0<(total number of luminance histograms of the black side interval)<threshold value 1; the gain linearly increases until threshold value 1≦(total number of luminance histograms of the black side interval)<threshold value 2; and the gain becomes gain 2 when threshold value 2≦(total number of luminance histograms of the black side interval). A more complicating gain conversion curve than FIG. 7 can be created by increasing the number of threshold values of the total number of luminance histograms and the number of settings of the gain.

The γ curve generating unit 110-1 generates the γ curve for raising the luminance based on the gain of the γ curve for raising the luminance set in step S110-1 (S112-1). The contrast of the portion contained in the black side interval of the input image enhances by the γ curve for raising the luminance generated in the above manner.

The γ curve for raising the luminance can be expressed with Equation (1) where X is the input luminance value, and gam_upper[X] is the output luminance value after luminance conversion.

$$\text{gam\_upper}[X] = \frac{\text{gain\_upper} \times (X - \text{end}) \times (\text{start} - X)}{256 \times (\text{start} - \text{end})} \quad (1)$$

In Equation (1),
gain_upper: gain of the gamma curve for raising the luminance
start: input luminance value for starting the luminance conversion process
end: input luminance value for terminating the luminance conversion process (when luminance conversion process is performed on the image subjected to the black stretch process, point at which the black stretch process result becomes Y (output)=0).

The process until the γ curve for raising the luminance to enhance the contrast of the black side interval is generated has been described, and now, the process until the γ curve for lowering the luminance to enhance the contrast of the white side interval is generated will be described.

The histogram calculating unit 106-2 calculates the total number of luminance histograms of the white side interval (S108-2). In calculating the total number of luminance histograms, the histogram calculating unit 106-2 creates the luminance histogram of the white side interval, and references the created luminance histogram to calculate the total number of luminance histograms of the white side interval (number of pixels contained in the white side interval). 128 division etc. is assumed for the accuracy of division of the luminance histogram, similar to the black side interval.

The gain setting unit 108-2 sets the gain of the γ curve for lowering the luminance based on the total number of luminance histograms calculated in step S108-2 (S110-2). The details of the method of setting the gain of the γ curve for lowering the luminance will be described with reference to the right diagram of FIG. 7. As shown in the right diagram of FIG. 7, the gain of the γ curve is set so as to become larger the greater the total number of luminance histograms. More specifically, in setting the gain of the γ curve for lowering the luminance, an arbitrary threshold value is set with respect to the total number of luminance histograms of the white side interval, and the gain is set so that a predetermined gain is obtained according to such threshold value. A case where two threshold values (threshold value 1, threshold value 2) of the total number of luminance histograms of the white side interval are provided is shown in the right diagram of FIG. 7, where the gain conversion curve for calculating the gain of the γ curve is set such that the gain is gain 1 until 0<(total number of luminance histograms of the white side interval)<threshold value 1; the gain linearly increases until threshold value 1≦(total number of luminance histograms of the white side interval)<threshold value 2; and the gain becomes gain 2 when threshold value 2≦(total number of luminance histograms of the white side interval). This is similar to the case of creating the γ curve for raising the luminance in that a more complicating gain conversion curve than FIG. 7 can be created by increasing the number of threshold values of the total number of luminance histograms and the number of settings of the gain. The threshold value of the total number of luminance histograms and the gain can be arbitrarily set with different values for the γ curve for raising the luminance and for the γ curve for lowering the luminance.

The γ curve generating unit 110-2 generates the γ curve for lowering the luminance based on the gain of the γ curve for lowering the luminance set in step S110-2 (S112-2). The contrast of the portion contained in the white side interval of the input image enhances by the γ curve for lowering the luminance generated in the above manner.

The γ curve for lowering the luminance can be expressed with Equation (2) where X is the input luminance value, and gam_lower[X] is the output luminance value after luminance conversion.

$$\text{gam\_lower}[X] = -\frac{\text{gain\_lower} \times (X - \text{end}) \times (\text{start} - X)}{256 \times (\text{start} - \text{end})} \quad (2)$$

In Equation (2), gain_lower: gain of the gamma curve for lowering the luminance start: input luminance value for starting the luminance conversion process end: input luminance value for terminating the luminance conversion process (when luminance conversion process is performed on the image subjected to the black stretch process, point at which the black stretch process result becomes Y (output)=0).

The γ curve combining unit 112 combines the γ curve for raising the luminance generated in step S112-1 and the γ curve for lowering the luminance generated in step S112-2 (S114).

If the γ curve for raising the luminance is generated by Equation (1) and the γ curve for lowering the luminance is generated by Equation (2), the γ curve after combination can be expressed with Equation (3) where gam[X] is the output luminance value after luminance conversion.

$$\text{gam}[X] = \text{gam\_upper}[X] + \text{gam\_lower}[X] \quad (3)$$

The luminance conversion unit 114 then performs the luminance conversion process on the input luminance data within the correction interval input to the image processing apparatus 10 using the γ curve combined in step S114, and outputs the output luminance data of after luminance conversion (S116). The γ curve can be optimized, and contrast enhancement of both intervals of the black side interval and the white side interval can be realized according to the picture of the input image by performing the luminance conversion process using the γ curve obtained by combining two γ curves, which are the γ curve for raising the luminance and the γ curve for lowering the luminance.

(Modified Example of Image Processing Method According to the Present Embodiment)

Figure 8:
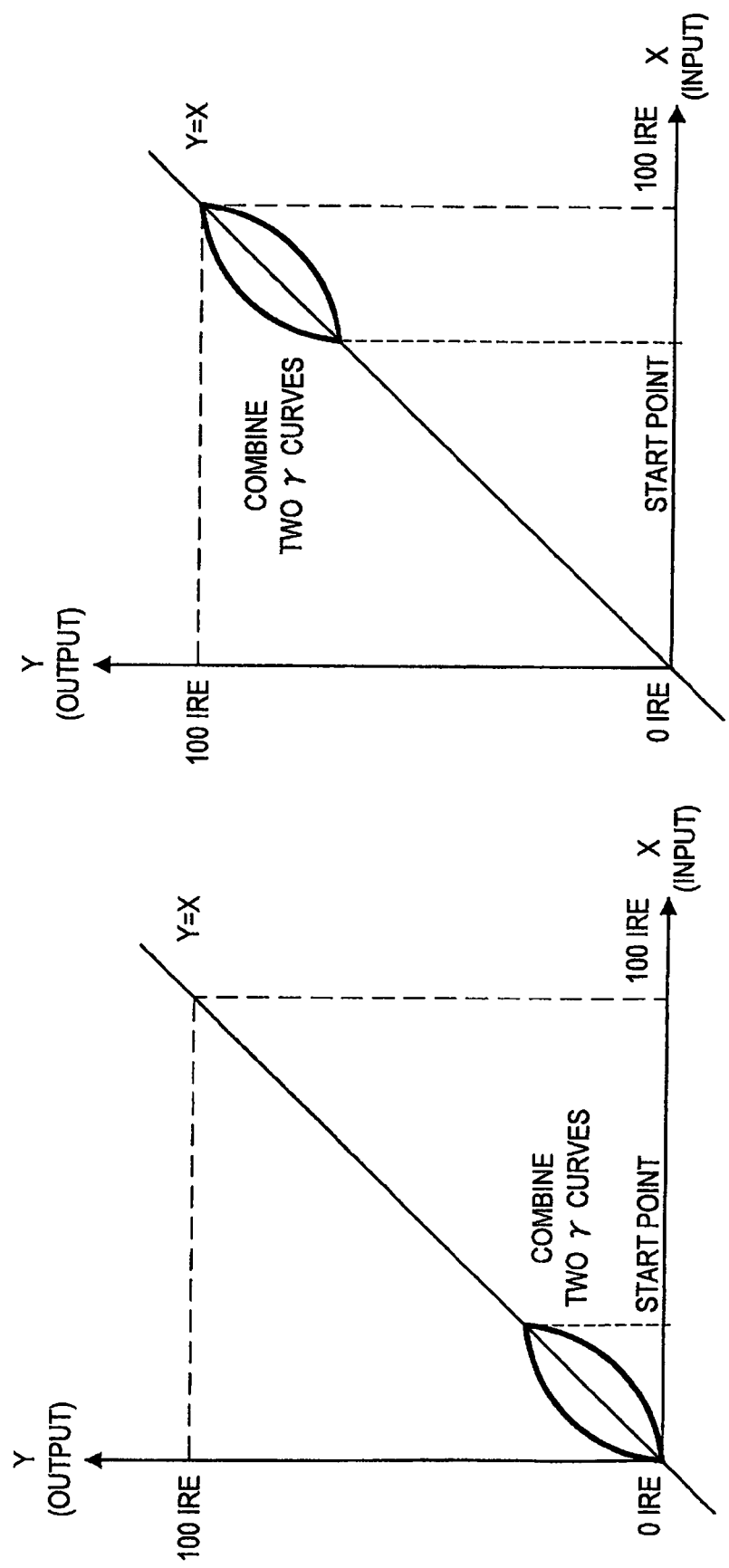
FIG. 8 is an explanatory view showing a modified example of the image processing method according to the embodiment.

The image processing method according to the present embodiment has been described above, but in the present embodiment, a case of performing further contrast enhancement on the image subjected to the black stretch process is assumed. However, the image processing method according to an embodiment of the present invention is not limited to such case, and can be applied to the luminance correction process of enhancing the contrast of an arbitrary interval near black of the image not subjected to the black stretch process, and furthermore, the luminance correction process of enhancing the contrast of an arbitrary interval near white of the image not subjected to the black stretch process, as shown in FIG. 8. FIG. 8 is an explanatory view showing a modified example of the image processing method according to the present embodiment.

First, as shown in the left diagram of FIG. 8, the correction interval is set such that the input luminance level is from an arbitrarily set starting point (arbitrary value at which input luminance level becomes a maximum in the correction interval) to a point of 0IRE, and the correction interval is divided into two intervals of the black side interval and the white side interval to realize contrast enhancement of the arbitrary interval near black. The γ curve for raising the luminance is generated from the total number of luminance histograms of the black side interval, the γ curve for lowering the luminance is generated from the total number of luminance histograms of the white side interval, and the two γ curves are combined. The contrast enhancement of the arbitrary interval near black can be realized by performing luminance conversion process using the combined γ curve.

As shown in the right diagram of FIG. 8, the correction interval is set such that the input luminance level is from an arbitrarily set starting point (arbitrary value at which input luminance level becomes a minimum in the correction interval) to a point of 100IRE, and the correction interval is divided into two intervals of the black side interval and the white side interval to realize contrast enhancement of the arbitrary interval near white. The γ curve for raising the luminance is generated from the total number of luminance histograms of the black side interval, the γ curve for lowering the luminance is generated from the total number of luminance histograms of the white side interval, and the two γ curves are combined. The contrast enhancement of the arbitrary interval near white can be realized by performing luminance conversion process using the combined γ curve.

(Effect of Contrast Enhancement by Image Processing Method According to the Present Embodiment)

Figure 11:
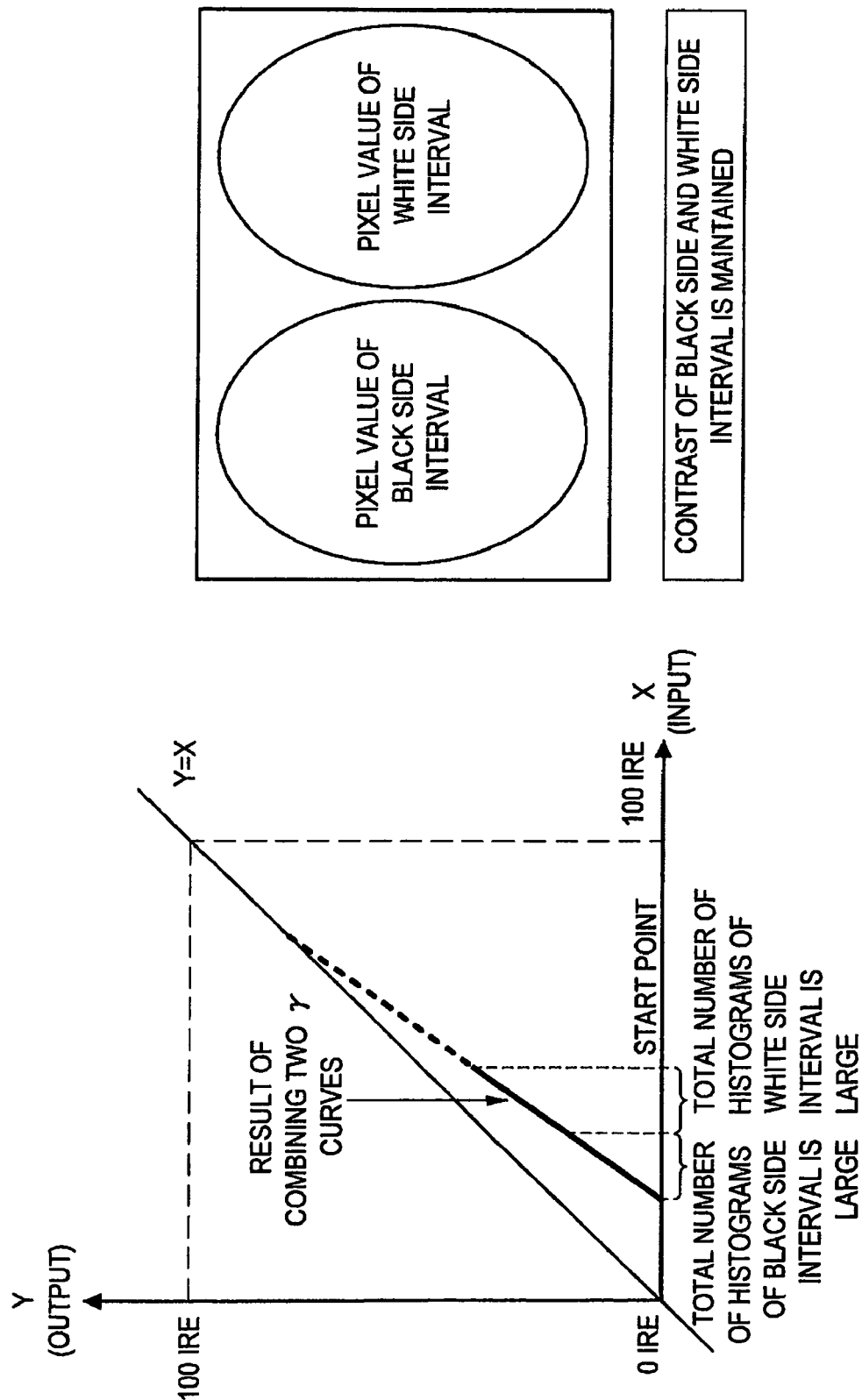
FIG. 11 is an explanatory view for describing effects of contrast enhancement of when the image processing method according to the embodiment is used.

Effects of contrast enhancement of when the image processing method according to the present embodiment described above is used will be described based on FIGS. 9 to 11. FIGS. 9 to 11 are explanatory views for describing the effects of contrast enhancement of when the image processing method according to the present embodiment is used.

<Case Where Total Number of Luminance Histograms of Black Side Interval is Large and Total Number of Luminance Histograms of White Side Interval is Small>

Firstly, the effects of contrast enhancement of when the total number of luminance histograms of the black side interval is large and the total number of luminance histograms of the white side interval is small will be described with reference to FIG. 9. As shown in FIG. 9, since the total number of luminance histograms of the black side interval is large, the γ curve for raising the luminance is obtained as a result of combining the two γ curves, and the contrast of the black side interval is enhanced.

If the total number of luminance histograms of the black side interval is large, this means that the proportion occupied by the pixel value of the black side interval of the pixel values contained in the correction interval is large. That is, if the contrast of the black side interval is enhanced by the image processing method according to the present embodiment, the contrast near black is enhanced without the blackest level being changed. Since the proportion occupied by the pixel value of the white side interval is small, even if the contrast of the white side interval is slightly lowered by the luminance correction process using the γ curve for raising the luminance, the influence on the entire input image is small and thus is not an issue.

<Case Where Total Number of Luminance Histograms of White Side Interval is Large and Total Number of Luminance Histograms of Black Side Interval is Small>

Secondly, the effects of contrast enhancement of when the total number of luminance histograms of the white side interval is large and the total number of luminance histograms of the black side interval is small will be described with reference to FIG. 10. As shown in FIG. 10, since the total number of luminance histograms of the white side interval is large, the γ curve for lowering the luminance is obtained as a result of combining the two γ curves, and the contrast of the white side interval is enhanced.

If the total number of luminance histograms of the white side interval is large, this means that the proportion occupied by the pixel value of the white side interval of the pixel values contained in the correction interval is large. That is, if the contrast of the white side interval is enhanced by the image processing method according to the present embodiment, the contrast near black is enhanced without the blackest level being changed. Since the proportion occupied by the pixel value of the black side interval is small, even if the contrast of the black side interval slightly lowered by the luminance correction process using the γ curve for lowering the luminance, the influence on the entire input image is small and thus is not an issue.

<Case Where Total Number of Luminance Histograms is Large for Both Black Side Interval and White Side Interval>

Thirdly, the effects of contrast enhancement of when the total number of luminance histograms is large for both the black side interval and the white side interval will be described with reference to FIG. 11. As shown in FIG. 11, since the total number of luminance histograms is large for both the black side interval and the white side interval, the two γ curves cancel each other out, and becomes zero as a result of combining the two γ curves (γ curve is not set).

If the total number of luminance histograms is large for both the black side interval and the white side interval, this means that the proportion occupied by the pixel values of both side intervals is large. In this case, if the γ curve is set, the contrast of one interval (e.g., black side interval) enhances but the contrast of the other interval (e.g., white side interval) lowers. To prevent such disadvantage from occurring, the contrast near black is maintained by not setting the γ curve and not performing the luminance correction process when the total number of luminance histograms of both intervals is large.

(Effects of Visibility Enhancement by Image Processing Method According to the Present Embodiment)

Figure 12:
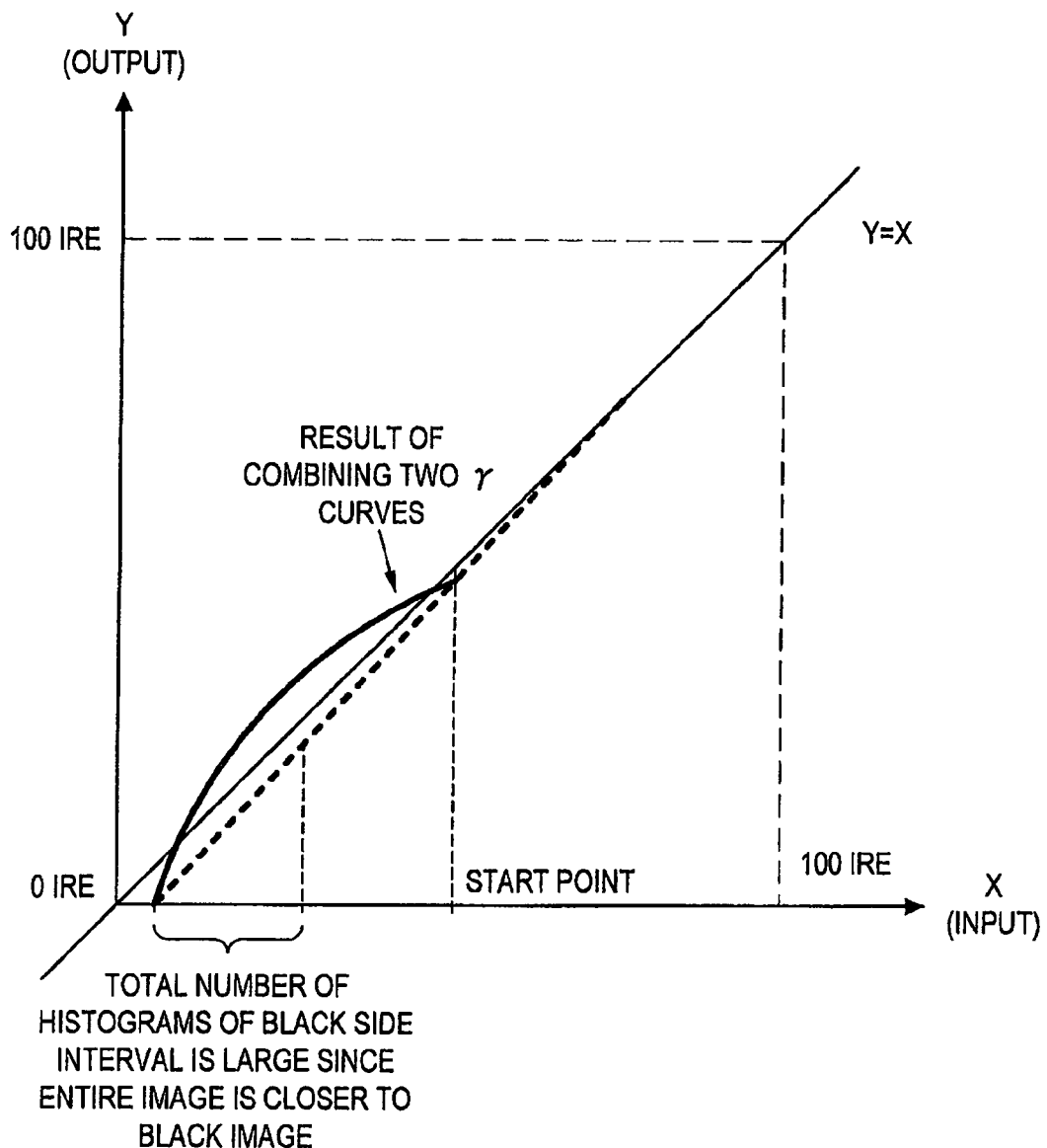
FIG. 12 is an explanatory view for describing effects of visibility enhancement of when the image processing method according to the embodiment is used.

The effects of visibility enhancement of when the entire screen is closer to black image when the image processing method according to the present embodiment described above is used will be described based on FIG. 12. FIG. 12 is an explanatory view for describing the effects of visibility enhancement of when the image processing method according to the present embodiment is used.

When the entire screen is closer to black image, black is barely drawn in the black stretch process. If the image processing method according to the present embodiment is applied to the image subjected to such black stretch process, the total number of histograms of the black side interval is large since the entire screen is closer to black image at the input/output characteristic of Y (output luminance)=X (input luminance). Therefore, the proportion occupied by the pixel value of the black side interval is large, and the γ curve for raising the luminance is obtained as a result of combining the two γ curves. The luminance of the black side interval can be raised and the visibility near black can be enhanced by performing luminance correction process on the image subjected to the black stretch process using the γ curve for raising the luminance. That is, even if the entire input image is dark, the visibility does not degrade according to the image processing method of the present embodiment.

It should be understood by those skilled in the art that various modifications, combinations, sub-combinations and alterations may occur depending on design requirements and other factors insofar as they are within the scope of the appended claims or the equivalents thereof.

A case of further enhancing the contrast by applying the present invention on the image subjected to the black stretch process has been described in the embodiment described above, but the present invention is not limited thereto, and the present invention is also applicable on the image not subjected to the black stretch process.

Furthermore, a case where the accuracy of division of the luminance histogram is 128 division is assumed in the embodiment described above, but the accuracy of division of the luminance histogram can be appropriately set according to the accuracy of contrast adjustment.

The method of setting the gain of the γ curve and the method of generating the γ curve are not limited to those described in the embodiment above, and are not particularly limited as long as the γ curve for raising the luminance and the γ curve for lowering the luminance can be generated based on the total number of luminance histograms of the black side interval and the white side interval.

What is claimed is:

1. An image processing apparatus for performing a luminance correction process of an input image by performing a luminance conversion process on input luminance data; the image processing apparatus comprising:
   a correction interval setting unit for setting a correction interval which is a range of luminance level for performing the luminance correction process;
   a correction interval dividing unit for dividing the correction interval into two intervals of a black side interval having low luminance level and a white side interval having high luminance level;
   histogram calculating units for calculating a total number of luminance histograms of the black side interval and a total number of luminance histograms of the white side interval, respectively;
   gain setting units for setting a gain of a gamma curve for raising the luminance based on the calculated total number of luminance histograms of the black side interval and a gain of a gamma curve for lowering the luminance based on the calculated total number of luminance histograms of the white side interval, respectively;

gamma curve generating units for generating a gamma curve for raising the luminance based on the gain of the curve for raising the luminance, and generating a gamma curve for lowering the luminance based on the gain of the curve for lowering the luminance, respectively;

wherein the gamma curve for raising the luminance is expressed with Equation (1) where X is an input luminance value and gam_upper [X] is an output luminance value after luminance conversion;

the gamma curve for lowering the luminance is expressed with Equation (2) where X is the input luminance value, and gam_lower[X] is an output luminance value after luminance conversion; and $$\text{gam\_upper}[X] = \frac{\text{gain\_upper} \times (X - \text{end}) \times (\text{start} - X)}{256 \times (\text{start} - \text{end})} \quad (1)$$

$$\text{gam\_lower}[X] = -\frac{\text{gain\_lower} \times (X - \text{end}) \times (\text{start} - X)}{256 \times (\text{start} - \text{end})} \quad (2)$$

in Equations (1) and (2),
gain_upper: gain of the gamma curve for raising the luminance
gain_lower: gain of the gamma curve for lowering the luminance
start: input luminance value for starting the luminance conversion process
end: input luminance value for terminating the luminance conversion process;

a gamma curve combining unit for combining the gamma curve for raising the luminance and the gamma curve for lowering the luminance; and a luminance conversion unit for performing the luminance conversion process on the input luminance data in the correction interval using the combined gamma curve.

2. The image processing apparatus according to claim 1, wherein the luminance correction process of an image subjected to a black stretch process is performed.

3. The image processing apparatus according to claim 2, wherein the correction interval is an interval from a predetermined luminance level to a luminance level at which output luminance data after the black stretch process becomes zero.

4. The image processing apparatus according to claim 1, wherein the correction interval is an interval in which the input luminance level is from a predetermined luminance level to a luminance level of 0[IRE].

5. The image processing apparatus according to claim 1, wherein the correction interval is an interval in which the input luminance level is from a predetermined luminance level to a luminance level of 100[IRE].

6. The image processing apparatus according to claim 1, wherein an accuracy of division of the luminance histogram is 128 divisions.

7. The image processing apparatus according to claim 1, wherein the gain of the gamma curve is set to be larger the greater the total number of luminance histograms.

8. The image processing apparatus according to claim 1, wherein
the gamma curve after combining the gamma curve for raising the luminance and the gamma curve for lowering the luminance is expressed with Equation (3) where gam[X] is an output luminance value after luminance conversion $$\text{gam}[X] = \text{gam\_upper}[X] + \text{gam\_lower}[X] \quad (3).$$

9. An image processing method for performing a luminance correction process of an input image by performing a luminance conversion process on input luminance data; the image processing method comprising the steps of:
setting a correction interval which is a range of luminance level for performing the luminance correction process;
dividing the correction interval into two intervals of a black side interval having low luminance level and a white side interval having high luminance level;
calculating a total number of luminance histograms of the black side interval and a total number of luminance histograms of the white side interval, respectively;
setting a gain of a gamma curve for raising the luminance based on the calculated total number of luminance histograms of the black side interval and a gain of a gamma curve for lowering the luminance based on the calculated total number of luminance histograms of the white side interval, respectively;
generating a gamma curve for raising the luminance based on the gain of the curve for raising the luminance, and generating a gamma curve for lowering the luminance based on the gain of the curve for lowering the luminance, respectively;
wherein the gamma curve for raising the luminance is expressed with Equation (1) where X is an input luminance value and gam_upper [X] is an output luminance value after luminance conversion;
the gamma curve for lowering the luminance is expressed with Equation (2) where X is the input luminance value, and gam_lower[X] is an output luminance value after luminance conversion; and $$\text{gam\_upper}[X] = \frac{\text{gain\_upper} \times (X - \text{end}) \times (\text{start} - X)}{256 \times (\text{start} - \text{end})} \quad (1)$$

$$\text{gam\_lower}[X] = -\frac{\text{gain\_lower} \times (X - \text{end}) \times (\text{start} - X)}{256 \times (\text{start} - \text{end})} \quad (2)$$

in Equations (1) and (2),
gain_upper: gain of the gamma curve for raising the luminance
gain_lower: gain of the gamma curve for lowering the luminance
start: input luminance value for starting the luminance conversion process
end: input luminance value for terminating the luminance conversion process;
combining the gamma curve for raising the luminance and the gamma curve for lowering the luminance; and
performing the luminance conversion process on the input luminance data in the correction interval using the combined gamma curve.

10. A non-transitory computer readable memory having stored thereon a program for causing a computer to function as,
a correction interval setting unit for setting a correction interval which is a range of luminance level for performing the luminance correction process;
a correction interval dividing unit for dividing the correction interval into two intervals of a black side interval having low luminance level and a white side interval having high luminance level;
histogram calculating units for calculating a total number of luminance histograms of the black side interval and a total number of luminance histograms of the white side interval, respectively;

gain setting units for setting a gain of a gamma curve for raising the luminance based on the calculated total number of luminance histograms of the black side interval and a gain of a gamma curve for lowering the luminance based on the calculated total number of luminance histograms of the white side interval, respectively;

gamma curve generating units for generating a gamma curve for raising the luminance based on the gain of the curve for raising the luminance, and generating a gamma curve for lowering the luminance based on the gain of the curve for lowering the luminance, respectively;

wherein the gamma curve for raising the luminance is expressed with Equation (1) where X is an input luminance value and gam_upper [X] is an output luminance value after luminance conversion;

the gamma curve for lowering the luminance is expressed with Equation (2) where X is the input luminance value, and gam_lower[X] is an output luminance value after luminance conversion; and $$\text{gam\_upper}[X] = \frac{\text{gain\_upper} \times (X - \text{end}) \times (\text{start} - X)}{256 \times (\text{start} - \text{end})} \quad (1)$$

$$\text{gam\_lower}[X] = -\frac{\text{gain\_lower} \times (X - \text{end}) \times (\text{start} - X)}{256 \times (\text{start} - \text{end})} \quad (2)$$

in Equations (1) and (2), gain_upper: gain of the gamma curve for raising the luminance gain_lower: gain of the gamma curve for lowering the luminance start: input luminance value for starting the luminance conversion process end: input luminance value for terminating the luminance conversion process;

a gamma curve combining unit for combining the gamma curve for raising the luminance and the gamma curve for lowering the luminance; and a luminance conversion unit for performing the luminance conversion process on the input luminance data in the correction interval using the combined gamma curve.

* * * * *